US008289152B1

(12) United States Patent  
Greenberger

(10) Patent No.: US 8,289,152 B1
(45) Date of Patent: Oct. 16, 2012

(54) EMERGENCY MANAGEMENT SYSTEM

(75) Inventor: Joel S. Greenberger, Sewickley, PA (US)

(73) Assignee: UPMC, Pittsburgh, PA (US)

(*) Notice: Subject to any disclaimer, the term of this patent is extended or adjusted under 35 U.S.C. 154(b) by 1488 days.

(21) Appl. No.: 11/780,042

(22) Filed: Jul. 19, 2007

Related U.S. Application Data

(60) Provisional application No. 60/820,116, filed on Jul. 24, 2006.

(51) Int. Cl.
*G08B 1/08* (2006.01)

(52) U.S. Cl. ............... 340/539.13; 340/601; 340/5.52

(58) Field of Classification Search ............ 340/539.13, 340/539.11, 539.1, 539.22, 539.28, 538.15, 340/539.26, 571, 600, 601, 5.52, 5.82
See application file for complete search history.

(56) References Cited

U.S. PATENT DOCUMENTS

| | | | |
|---|---|---|---|
| 4,642,463 A | 2/1987 | Thoms | |
| 5,099,127 A | 3/1992 | Kitaguchi et al. | |
| 5,173,609 A | 12/1992 | Lacoste et al. | |
| 5,235,318 A | 8/1993 | Schulcz | |
| 6,031,454 A * | 2/2000 | Lovejoy et al. | 340/539.29 |
| 6,282,410 B1 | 8/2001 | Monsen, III et al. | |
| 6,628,201 B2 | 9/2003 | Cho et al. | |
| 6,633,327 B1 | 10/2003 | Williams et al. | |
| 6,703,922 B2 | 3/2004 | Shih et al. | |
| 6,891,470 B2 | 5/2005 | Bohinc, Jr. | |
| 6,891,476 B2 * | 5/2005 | Kitaguchi et al. | 340/573.1 |
| 6,917,288 B2 * | 7/2005 | Kimmel et al. | 340/511 |
| 7,194,395 B2 * | 3/2007 | Genovese | 703/6 |
| 7,769,848 B2 * | 8/2010 | Choy et al. | 709/224 |
| 2003/0112144 A1 | 6/2003 | Campman | |
| 2004/0119591 A1 * | 6/2004 | Peeters | 340/539.26 |
| 2005/0078004 A1 * | 4/2005 | Johnson | 340/539.26 |
| 2007/0018807 A1 * | 1/2007 | Craig et al. | 340/500 |
| 2007/0059207 A1 * | 3/2007 | Lin et al. | 422/70 |
| 2007/0222585 A1 * | 9/2007 | Sabol et al. | 340/539.11 |
| 2008/0140479 A1 * | 6/2008 | Mello et al. | 705/7 |

* cited by examiner

*Primary Examiner* — Daniel Previl
(74) *Attorney, Agent, or Firm* — Tracey Beiriger

(57) ABSTRACT

An emergency management system includes a plurality of command centers, each having real time updated information about an area of interest, a plurality of uniquely identifiable portable monitors, each of the monitors including a sensor portion for determining one or more exposure parameters, and each of the monitors including a communications portion for providing two-way communications over redundant communications channels with at least two of the command centers. A method of managing emergency responders is also provided.

20 Claims, 3 Drawing Sheets

EMERGENCY MANAGEMENT SYSTEM

CROSS REFERENCE TO RELATED APPLICATION

This application claims the benefit of U.S. Provisional Patent Application Ser. No. 60/820,116, filed Jul. 24, 2006, the contents of which are hereby incorporated by reference in its entirety.

FIELD OF THE INVENTION

This invention relates to emergency management systems, and more particularly to emergency management systems involving a large number of first responders.

BACKGROUND OF THE INVENTION

In the event of an emergency incident in which an area is subjected to hazardous chemicals, biological agents, or radiation, emergency services must be made rapidly available to persons in the affected area.

Emergency services personnel, also referred to as first responders, will enter the area and be exposed to the hazardous chemicals, biological agents, or radiation. To protect the safety of the first responders, it is important to minimize their exposure to the hazardous chemicals, biological agents, or radiation. With respect to exposure to radiation, since adverse effects do not appear immediately, first responders may not be aware of excessive exposure when providing emergency services.

However, in preparedness drills and plans for disaster management, there has been little teaching directed toward situations in which first responders would be instructed not to enter an area, or to enter only when carrying specific detection devices. In the absence of such risk management for first responders, well meaning and heroic people will undoubtedly sustain exposure to higher levels of toxins or radiation than that which can be managed safely in a first responder's scenario.

Thus a need exists for an emergency management system that can be used to minimize the exposure of first responders to hazardous chemicals, biological agents, or radiation.

SUMMARY OF THE INVENTION

In one aspect, the invention provides an emergency management system including a plurality of command centers, each having real time updated information about an area of interest, a plurality of uniquely identifiable portable monitors, each of the monitors including a sensor portion for determining one or more exposure parameters, and each of the monitors including a communications portion for providing two-way communications over redundant communications channels with at least two of the command centers.

In another aspect, the invention provides a method of managing emergency responders, the method including the steps of receiving information from a plurality of uniquely identifiable portable monitors; integrating the information with supplemental data; and transmitting instructions to the emergency responders based on an assessment of the information and the supplemental data. The supplemental data can be real time updated supplemental data that includes one or more of: weather patterns, geographic changes, physical asset status, geo-satellite monitoring information, road conditions, and the availability of hospitals to manage "surge capacity" of casualties.

In another aspect, the invention provides a monitoring device including a sensor portion for determining one or more exposure parameters, a communications portion for transmitting the exposure parameters over a communications channel, and an identification generator for producing an identification tag associating the monitoring device with a user.

DETAILED DESCRIPTION OF THE INVENTION

Figure 1:
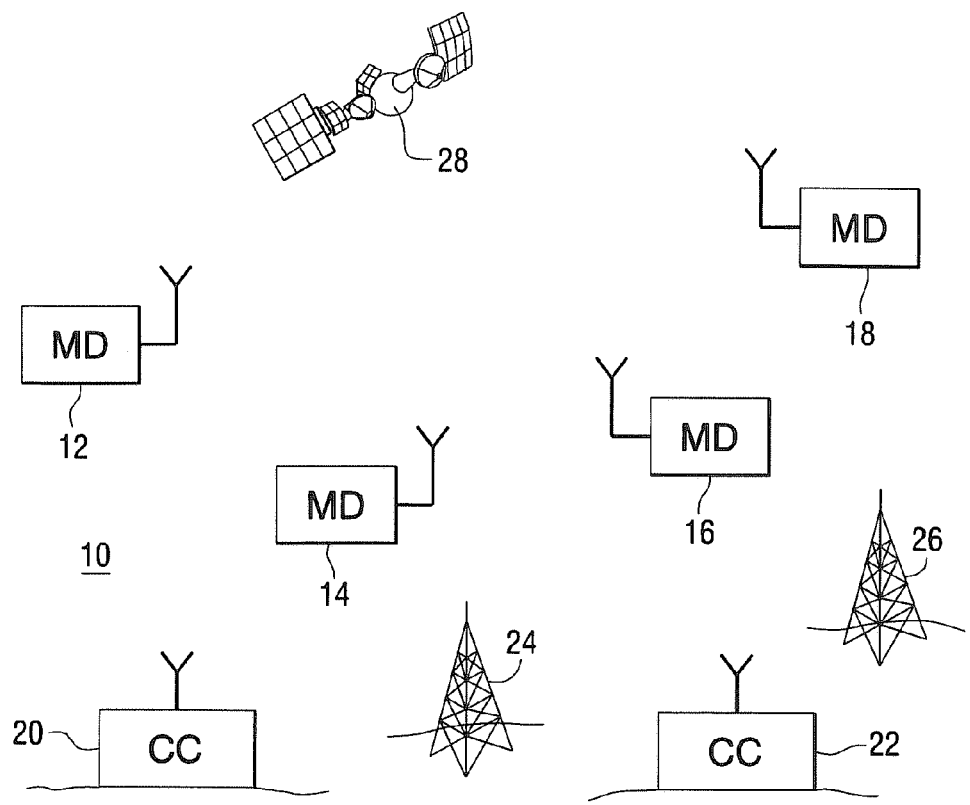
FIG. 1 is a diagram of an emergency management system constructed in accordance with an embodiment of the invention.

FIG. 1 is a diagram of an emergency management system 10 constructed in accordance with an embodiment of the invention. The system includes a plurality of portable, uniquely identifiable, monitoring devices 12, 14, 16, 18 that are capable of two-way communication with a plurality of command centers 20 and 22, using redundant communications links. The communications links can include, for example, cellular telephones, radio channels, and/or satellite communications channels. In this example, communications towers 24 and 26, which can be part of a cellular telephone system, and/or one or more satellites 28, can serve as components of the communications channels. The command centers would preferably be separated geographically, such that more than one command center is unlikely to be subjected to conditions that created the emergency. The command centers can be at fixed locations, or mounted in mobile units.

Figure 2:
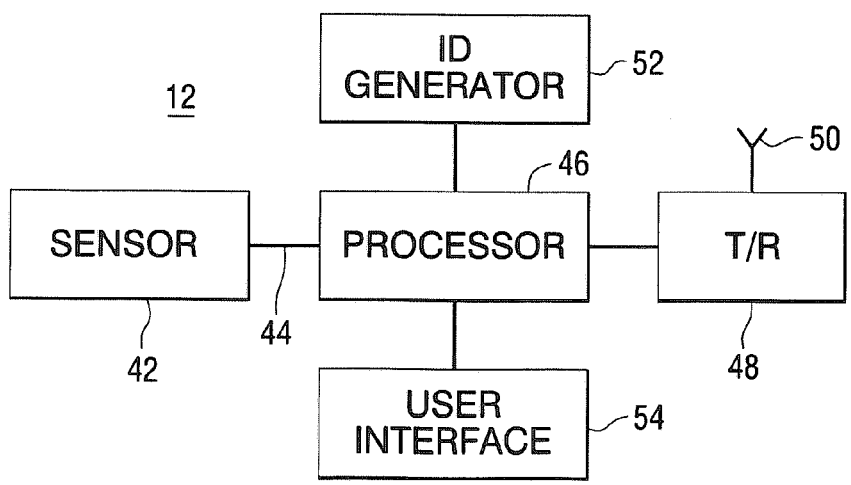
FIG. 2 is a block diagram of a monitoring device that can be used in the system of FIG. 1.

FIG. 2 is a block diagram of a monitoring device 12 that can be used in the system of FIG. 1. The monitoring device in this example includes one or more sensors or detectors, such as a sensor 42 that is capable of detecting, for example, hazardous chemicals, biological agents, or radiation. For clarity, the following description will refer to radiation, however, other hazardous conditions, chemicals or agents, can also be monitored.

The sensor produces a signal on line 44 in response to the detection of radiation. A processor 46, which can be for example a microprocessor, computer, or other signal processing device, receives the signal from the sensor and processes the signal to produce a desired output. The output can include, for example in a radiation incident: a) a radiation dose, b) a dose rate, and c) the cumulative dose sustained since the time the monitoring device was turned on. The output of the processor can then be sent to a transceiver 48 that is connected to an antenna 50. The transceiver can transmit the processor output to at least two command centers. While the example in FIG. 2 uses a transceiver, the transmit and receive functions can be implemented using a separate transmitter and receiver.

An identification tag generator 52 can be included to produce a unique identification tag, or other form of identification, that can be used to identify both the monitoring device and the person carrying the monitoring device. In one example, the identification tag generator 52 includes a printer that can be used to print a bar code that can be attached to the person carrying the monitoring device. Information in the bar code can then be used to associate that person with the particular monitoring device.

The unique identifier for each responder can also take the form of an electronic transmission of a "bar code" analogous identifier. This would be similar to the transponder code that is "squawked" by airplanes entering a traffic control area. The identifier may be assigned by the command center, but could also be produced using a preinstalled software package, and then monitored. For example, if there is an ambulance in a first region, and there are three monitoring devices to be assigned to three personnel in that ambulance, the command center could notify those three people of a specific code, which could be linked to their name, social security number, or some other personal identifier. Then each of the individuals would be instructed to enter the code into his/her monitoring device, for example by typing the code on a keyboard, and pressing an "enter" key. The command center would then confirm that the code has been entered into the monitoring device. Then that monitoring device can be permanently assigned that particular number, for that particular event. The ID features can be implemented using various formats.

The monitoring device can be implemented using a small laptop or handheld computer, and can include a Geiger counter, which will record dose, dose rate, and/or cumulative dose sustained since the monitoring device was turned on. This information can be transmitted by several redundant communications channels to at least two of the command centers.

The identification tag generator can have a printer for printing an identification tag that can be removed from the device and placed on the person in the event the person is separated from the monitoring device. The ID tag can include a bar code or other unique identifier. The monitoring device can further include a cell phone or text message portion that enables the command center to communicate with each individual responder to provide instructions, directions, and/or commands, such as a "get out of the area" command.

In one example, the monitoring devices can include portable ionizing radiation dose detectors (which may be attached in the same unit to a computational device) that record in real time: a) a radiation dose, b) a dose rate, and/or c) a cumulative dose sustained since the time the device was turned on. The monitoring device can include, or be attached to, an interactive wireless and redundant (e.g., telephone/satellite link/radio transmission) transmitter and receiver system that can communicate with multiple command centers.

Each monitoring device is distinguishable from the plurality of other monitoring devices carried by each of a large number of emergency responder personnel. In one example, each monitoring device can be distinguished by a unique transponder code that is distinguishable from all other devices. In one example, each device transmits (possibly in real time) updates of the data described above to the redundant command centers.

The monitoring devices can be packaged in a single unit the size of a laptop computer/handheld computer worn by an individual, such as an emergency responder, policeman, fireman, or military personnel.

The sensor can be a radiation dose detector (for example, a miniaturized Geiger counter, ionization-chamber, or dosimeter) that is self contained and battery powered, with a battery capacity providing 24 to 48 hours of operation.

The processor can be a computer/calculator that receives data from the radiation dose detector, and records the dose rate in cGy (RAD) per minute. The processor output can be communicated in real time, and updated in real time, in intervals of, for example, no less than 10 seconds.

The transceiver can produce a wireless digital transmission signal output which can be transmitted by each of several emergency network systems, including but not limited to cellular phone wireless pathways, satellite uplink pathways, or radio wavelength linked pathways to closed circuit broadband or military band/civil defense band communications channels.

The user interface can comprise a text message screen for receiving digitized messages from the command center to deliver "just in time" instructions and messages, such as messages for directing the user to carry out certain operations. The user interface can further include an input device, such as a keyboard or touch screen to allow the first responder to enter information into the monitoring device.

Figure 3:
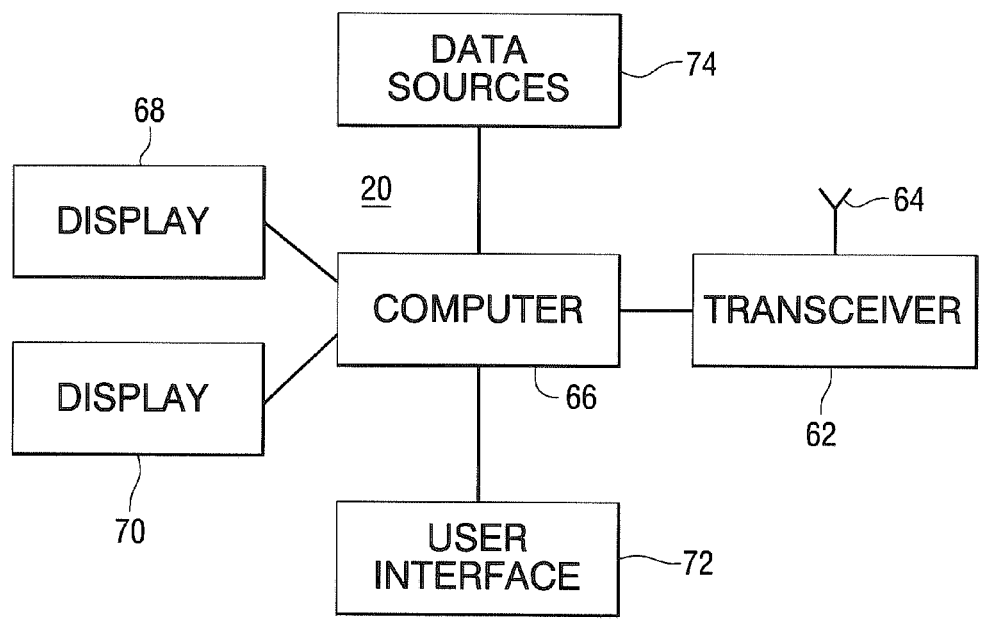
FIG. 3 is a block diagram of a command center that can be used in the system of FIG. 1.

FIG. 3 is a block diagram of a command center 20 that can be used in the system of FIG. 1. The command center includes a transceiver 62 capable of transmitting information to the monitoring devices, and receiving information from the monitoring devices, a computer or other processing device 66, and one or more displays 68 and 70, that provide a visual indication of the location and status of the monitoring devices, as well as information about the area of interest. A user interface 72 is provided to allow a user to interface with the computer, such as by entering data or programming the computer. A plurality of data sources can be accessed by the computer to provide supplemental data. These data sources can be databases or other data sources.

The transceiver 62 can include a wireless digitized information receiver capable of handling real time changing messages from hundreds to thousands of individual transmitters (analogous to an airport traffic controller screen receiving transponder code information from airplanes in a terminal control area, communicating speed, altitude, and course).

The transceiver can receive packets of information from each monitoring device indicating for example radiation dose, dose rate, cumulative dose sustained, as well as the position/location of each monitoring device with respect to an area of interest. This information can be delivered to the command center in real time using updated geographic coordinates linked to a specific broadcast code of the particular monitoring device. In one example, the determination of the geographic coordinates is analogous to locating a cell phone in a particular location by triangulating its position relative to cell locations. In another example, the position of the monitoring device could be determined by using satellite digitized information triangulation (as in military operation's detection of individual military personnel). Knowledge of the device position allows the monitoring device to deliver critical information to the command center.

Each of several redundant command centers can be located in a fixed or mobile platform (for example, a truck, trailer, military vehicle, or aircraft) and receives the broadcast information and real time updates from each of the monitoring devices.

The command center transceiver can be implemented using a cell phone transceiver, or a closed circuit or limited circuit radio receiver. The command center can be capable of receiving and graphically displaying real time information from a large number (100's to N) of transmitter devices, and displaying information unique to each, such as ionizing irradiation dose, dose rate, and cumulative dose.

Figure 4:
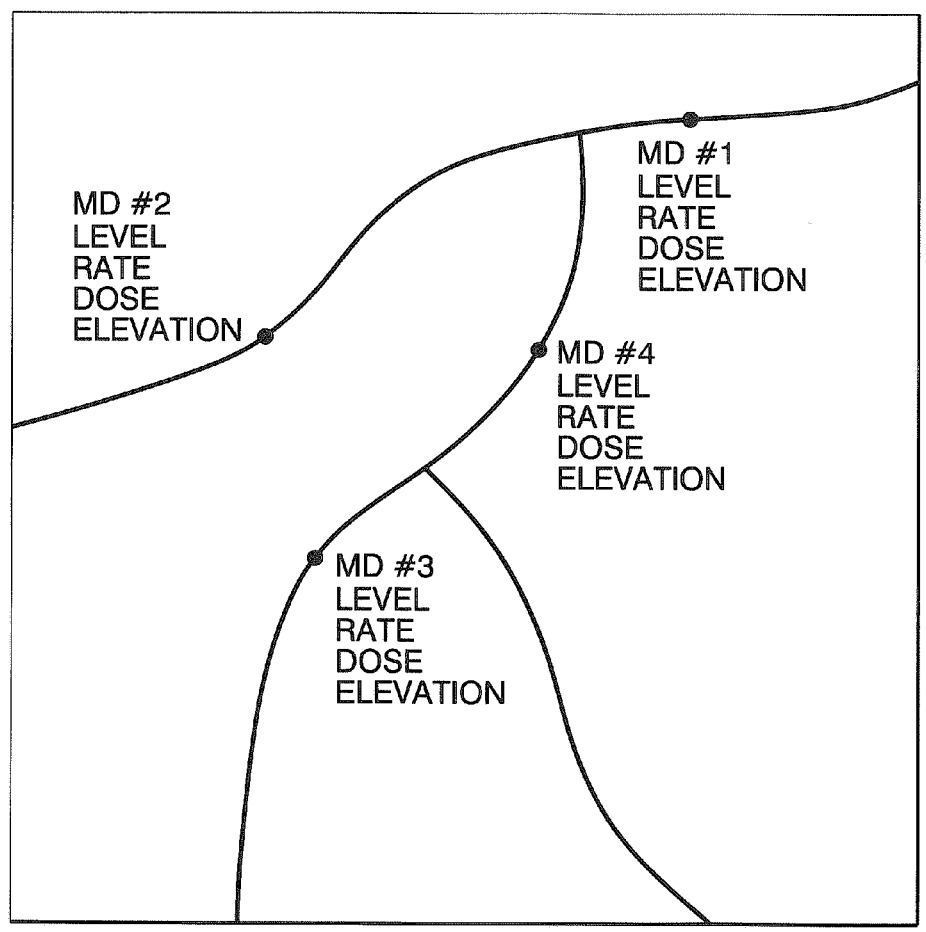
FIG. 4 is a schematic representation of a display at a command center.

FIG. 4 is a schematic representation of a display at a command center. Received data can be portrayed on a screen showing the location of each monitoring device and the data transmitted from each monitoring device. The display can include a map overlay to geographically map (in real time) each of the parameters received from the monitoring devices with respect to an area of interest. For example, updated information in real time can facilitate the graphic display of patterns of real time radiation levels and the changes in level as reflected in the dose rate number, and also the change in cumulative dose sustained by each monitoring device in a particular area relative to another area on the map. As such, the data pattern provides a real time three-dimensional map of radiation exposure levels in the region. The display can be, for example, an air traffic control computer display screen, a computer video monitor, or a television monitor.

The display can include three-dimensional information. For example, it can include elevation information indicating the elevation of the monitoring devices or of other items in the display. A three-dimensional display is better than a two-dimensional display of responders' locations, as it can provide data relative to hilly neighborhoods and first responders entering skyscrapers, and can be used to monitor movement up and down (as well as East/West/North/South) of a plume/cloud of radiation levels. The three-dimensional data can be compared in real time with theoretical measurements of predicted dose, as information from government and Homeland Security officials is received. Thus the system can compare in real time, actual measurements with predicted patterns of radiation levels and cloud movement. The elevation of the first responders in hilly neighborhoods will change, and the movement of a radioactive cloud will change in three dimensions. Furthermore, first responders entering a skyscraper or high elevation may be exposed to radioactivity in ventilation systems or in air handling systems, which would not be shown properly when displayed in a two-dimensional format.

In other embodiments, the system can receive and integrate information from fixed wing aircraft and/or helicopter transponders using specific squawk transponder codes linked to real time updated data such as altitude, course, and speed and substituting for this information ionizing irradiation dose, dose rate, and cumulative dose. Information can also be linked to geographic locations relative to the command center/receiving device.

In the event of detonation of a dirty bomb or fission bomb, first responders (e.g., police, fire department, emergency medical technicians, and other concerned citizens) will be at risk from radiation contamination and radiation exposure. The acquisition of data as to radiation dose levels, patterns of dispersal, and other measurements of the magnitude of radiation risk must be acquired rapidly and updated in real time. This information can then be fed back to first responders to allow them to manage their personal time of exposure during evacuation of casualties. First responders must also be notified (in real time) of where to take casualties and how to triage injuries relative to parameters of physical trauma. In addition, radiation exposure levels experienced by the casualties can be provided.

Radiation detection devices for measuring dose rate and dose level on the ground and in the air need to be acquired by first responders using available roadways coming into the detonation area. Personnel in the command center can assess the information received from the monitoring devices, and combine this information with other available information to determine appropriate instructions to be sent to the first responders. The other available information might include geographic information and information about available resources, such as treatment centers and clear paths of ingress and egress.

In an example operating scenario, Geiger counter readings (of, for example, 100 milli-rem/hour) would be communicated by the command center to each vehicle entering the area of interest, with instructions to stop on that particular road location, set up a roadblock, and/or monitor radiation levels. If levels increase in that particular area, data would be sent back to the command center and that particular roadblock could be moved further from the detonation center. If radiation dose levels decrease (perhaps due to prevailing winds pushing a radiation cloud in the opposite direction), a roadblock at that particular site could be instructed to move in closer to the detonation site. These placements would occur and be updated in real time with respect to all roads and ingress/egress access points to the detonation area.

Evacuation of casualties could be managed from these checkpoints/roadblock areas. People exiting on their own (i.e., walking wounded) could be checked for radiation levels, given bar code designations or other identification information, logged into a master record with computer linkage to the command center, and then instructed to go to specific triage points for medical management.

Second groups of first responders approaching each checkpoint from the periphery could be instructed as to how to evacuate casualties with respect to how long each responder should stay in an irradiation environment. They could also receive instructions as to how to use dosimeters (Geiger counters) to read dose rates and monitor their own personal dwell time by using dose rate and time calculations (not waiting for development of data from "non-real time" devices such as a radiation badge or a Thermoluminescent Dosimeter (TLD) device).

Each first responder entering the area of interest from the roadblock could similarly be issued a bar code and monitored for daily time and total dose. This data could be kept in the command center as well. Once each first responder has exceeded a daily exposure level maximum (or in cases of multiple days of evacuation requirements, the total exposure), the first responder would be dismissed from the area for that day, or permanently, and would no longer be available to manage evacuations.

In one example, the command center computer can include a software package that integrates several databases. A first database can include the radiation dose levels at various locations in an area of interest, such as in concentric circles emanating from the detonation point of a dirty bomb (taking into account prevailing winds for dust particles) and/or a fission bomb calculating the magnitude of the explosion and radioactivity levels. Radiation levels could be provided on each of the concentric circles, and would be updated in real time as the environment changes. The concentric circles can be displayed on a screen at the command center.

A second database can include a real time updated geographic map of the surrounding region (covering for example, a one mile diameter area for a dirty bomb, or a 100 mile diameter area for a fission bomb) with descriptions and designations of all roadways, railroad tracks, pipelines, irrigation tracks, and methods of unorganized and unsupervised human ingress or egress from the area.

A third database can include the location relative to the detonation point of all hospitals, fire departments, police stations, emergency response vehicles, emergency response personnel, hospitals, care facilities, clinics, and triage facilities where casualties may be taken relative to some reference point in the area of interest (such as a detonation point) and all other areas to be integrated within an evacuation program.

A fourth database can include real time updated prevailing weather conditions including rain, wind, wind patterns, and temperature. Weather patterns can be used to determine radioactive dust dispersal, with frequent updates to facilitate the direction of personnel in and out of the evacuation area.

A fifth database can include traffic routes in and out of the area. Data from one or all of these databases can be included in the display at the command center.

Much of this information may be available from various sources; however, integration of all these programs into a manageable format can be a valuable addition to a disaster management program. Furthermore, successful design and implementation of such a program might be of value to the Federal Government for translation to a national database applicable to geographic regions throughout the continental United States.

Real time dose levels and movement information provide the ability to integrate all the data coming in from the responders to the map at the command center. The location and capabilities of all evacuation facilities, hospitals, and triage centers can be updated in real time as areas are taken out (out of the theater) by irradiation exposure or other blast damage. For example, the map could be updated in real time by either removal of hospital facilities due to blast damage, exceeding surge capacity, or other reasons to exclude (for example, no one showed up for work).

The command center display can include a large computer screen that can display for each individual device, the dose, dose rate, and cumulative dose sustained by that person. The command center can be a redundant system located in one or more physical structures (and also possibly in a mobile vehicle) such that a display of the data coming in from hundreds or thousands of responders can be integrated on a map. The movement of radiation levels could be shown in real time and matched to what would be the "calculated" radiation exposure level of each site, based on knowledge of the dirty bomb or fission device.

With redundant command centers, one center has to be the "operational command center of record". This is analogous to a transfer of the flag in a naval task force. If the commander of the task force is on an aircraft carrier, and that aircraft carrier is immobilized by enemy action, the Navy routinely transfers the "flag". This means that the task force commander transfers to a different ship. Command can transfer from one center to another. Each command center would have a "real time command entry code" entered in the software package for that center as it receives information. One command center is designated as the "command center of record". While information might be transmitted to other centers, these other centers would not be in control. The people at those other centers would be able to watch and potentially interact by off-line communication with the command center of record, but the redundant command centers would not be operational unless the actuation command code is entered.

The system may further provide the ability to manage the casualties by being able to record dose sustained, heat, trauma, and other types of injury. In addition, moving the casualties may be part of the process.

In one embodiment, the system includes portable monitoring devices carried by first responders into the "hot zone" of a fission bomb or a dirty bomb. This device (and its centralized control at the command center) would be linked in real time with hundreds of EMS personnel surrounding the blast zone. The monitoring devices would dispense bar code identifiers (or another form of identification such as a label) for each responder and measure radiation levels and dose rate, such that both the individual first responder and command center know each person's current radiation exposure (dose rate and time exposed) and will alert each person as to how much time he/she should remain in the work area. Those responders who have sustained a maximum dose can be identified and notified that they should leave the area for the day and/or not return to work. These features can be integrated with an updated map of cloud dispersal and changing circles of "hot zone"; as well as with a map of the area, roads, access routes and locations of casualties, and the locations of regional levels 1 to 4 casualty receiving sites. The positions of all EMS vehicles and numbers of responders available at each location can be adjusted for maximum effectiveness.

In one example, if 1 Rem (1,000 milli-rem) is considered to be the maximum total body exposure for an emergency responder to receive during the entire time of his/her involvement in the evacuation process, this would be the number in the command center which would alert the command center after evaluation of the daily Geiger counter readings and the bar code designation for that emergency response person, that he/she should no longer be allowed to go into that area.

Continuing with the example, if the dose rate in an area being serviced by policeman #101 is 100 milli-rem/hour and on day 1 he spends a total of 2 hours in that area, then he has accrued 200 milli-rem, and if on the second day he goes into a much hotter area which has 500 milli-rem/hour and works for one hour, he would then have 700 milli-rem for the two days. On the third day he must be instructed not to exceed 300 milli-rem, and thus, he would be assigned to an area far from the detonation center. Once people have achieved the maximum dose, they need to be removed from the theater.

Bar code labeling devices can be implemented so that the command center can operate from a mobile Emergency Response Unit, say on a particular road coming into the contaminated area, and can inform the command center that the unit has, for example, 20 personnel ready to enter the "hot zone". The command center can then issue bar code labeling information for 20 people to the Emergency Response Unit over handheld devices. These codes can be recorded centrally at a designation checkpoint. The system includes provisions for getting people "labeled" in real time at a distance.

Monitoring the dose sustained by each person in a simple and robust manner is another issue. Geiger counter readings from each responder may not be practical, but readings at each deployment point and determining an exposure time, by for example having stopwatches on every EMS responder would be practical. One method might be to issue a stopwatch for each person entering the "hot zone" after he/she has obtained a bar code label. The dose and dose rate at the entry point is known, and the time until the person returns to that entry point will be known. The calculation can be made and the dose sustained for that day can be recorded.

Team leaders and each EMS response team would need training, probably on the fly through the handheld computer system. Then the team leaders, with the bar code labeling and dose sustained data, can make the decision that "you are done for the day" or "you should not come back at all". This strategy would be designed to minimize casualties in the first responders.

In some embodiments, the system of this invention can integrate real time updated weather pattern information, and geographic changes including the removal of assets by explosion, or radioactivity. Data regarding the removal of physical assets, geo-political satellite monitoring data regarding changes in topography, evaluation of the availability of roads and passageways in and out of disaster areas, availability of hospital beds, and management of "surge" capacity of the emergency care facilities can also be taken into account.

The system may further provide the ability to commandeer/access multiple cellular phone networks, geo-satellite networks, integrated communication networks, cell phone, television, radio, and other multiple bandwidth communication pathways for information transfer.

The system can also have the ability to integrate in real time (and match in real time) data from hundreds or thousands of first responders coming into the area of interest with the calculated radiation dose as reported and calculated centrally based upon the availability of information regarding the quantity of radiation, the quality of radiation, and expected patterns of spread. The system can also provide real time matching or comparison of expected data with actually acquired data.

The system can also include an interactive capacity for transmitting (in redundant systems) voice/text message/alarm system information to first responders. This information can not only indicate that they should immediately leave the area, but can also indicate the direction in which they should travel to gain egress in a relatively radiation reduced environment.

The system can integrate information from numerous sources to provide efficient emergency management. Hundreds or thousands of first responders can carry a handheld device which incorporates the level of complexity of data transmission and integration of several orders of magnitude beyond what is currently available in such a handheld device. The device can transmit to the command center (in real time) radiation dose, dose rate, and cumulative dose sustained by the bearer of the device. In addition the device may allow transmission by the responder of text messages, cell phone audio, and three-dimensional geographic positioning of the device and its bearer. The device may be modified to sense chemicals and detect biological agents as well and transmit this data to the command center.

The invention provides a greater magnitude, scope, and complexity of the data received by each handheld device, than is otherwise currently available.

The command center may transmit to the device and its bearer, any or all of the following information: just in time instructions as to where to go, when to leave the area, the route to take to leave the area, and updated information on movement of radiation levels/radiation cloud, radiation dose, and availability of evacuation sites to move casualties from the hot zone; weather reports and updates; the positions of other first responders in the immediate proximity and total evacuation area; the position of that responder in three dimensions relative to the hot zone; three-dimensional map coordinates of roads that are passable, those that are impassable, hospital surge capacity responses (e.g., which hospitals are filled, which are still receiving casualties); other evacuation sites; the estimated time left for that first responder to stay in the hot zone, estimated time of mandatory exit from the hot zone, and real time updates on these changes; and just in time information regarding methods by which to handle casualties, information as to the type of radiation, quality, dose and dose rate, and factors of importance for the EMS responder (for example: wear gas mask, particulate plutonium-239 dust is suspected in the area). Another example might be: remove all outer clothing and outer garments from casualties to be evacuated, beta-radiation deposition on clothing and skin surfaces suspected.

The devices worn or carried by the first responders can be portable, lightweight, all weather handheld units that are easily used in a harsh environment and conform to military specification (Mil-Std-810) and IP67 ratings against water and dust. The devices can permit two-way communications of information, GPS coordinates, and sensor data. This can be accomplished with multiple interfaces to permit a fully redundant communication environment. In one example, the primary protocol of the devices can support the IEEE802 standard using standard IP transports. The devices can use an integrated WIFI, WIMAX or commercial wireless vendor for a transport facility. A separate adapter port can be configured to support a serial interface to satellite or other radio communication systems. The information collected can be sent to a central repository for logging of all data associated with the device, the first responder, and the event.

A commercial off-the-shelf database can be configured to support various aspects of radiation monitoring including first responder dose accumulation, sensor location, specific radiation levels, the type of radiation, first responder life time exposure, and radiation level by GPS location. This is a real time environment and information collected will be immediately available at an Emergency Operation Center (EOC), to on-scene commanders and to the first responders, which will provide true situational awareness through the Geospatial Information System environment (GIS).

The use of specialized software tools such as GIS, and three-dimensional modeling and visualization technology can permit the tracking of all first responders in the contamination area, and permit plume and other modeling activities. Information from the devices can be transmitted back to the EOC and stored in the repository, along with other geospatial information such as maps, topographical information, and satellite radar imaging, which can be processed by specialized software such as three-dimensional grid fencing.

The information collected by the repository can include specific radiation information and exposure of the first responder along with GPS location (longitude, latitude, and elevation). Through the use of plume modeling software and information collected, the system can be used to track and predict radiation levels based upon current and projected weather information and ground topography. Through the use of demographic and road information as a GIS layer, first responders and victims can be evacuated through the lowest radiation levels and avoid hot spots. The system can pre-generate exit routes for the population and emergency personnel. Plume modeling can be accomplished by using GPS information collected by the devices, which will have the exact locations plotted on a GIS layer and present a two-dimensional picture of the radiation area along with the specific location of the first responder. For example, if a first responder is located on the 20th floor of a building, the GPS system may provide the specific location along with elevation. To further enhance situational awareness, another layer of geospatial information may be available to display elevation.

In one example, by overlaying geospatial data such as maps and building information created by satellite imaging, a three-dimensional picture of responder location will be available. This will also give a three-dimensional display of the plume and dispersion levels of radiation. To enhance situational awareness even further, another layer of geospatial information can be added which will include a color-coded display to indicate radiation exposure and the current condition of the responder. For example, green for acceptable, yellow as a warning for the EOC to replace the responder, and red as a full alert to evacuate the responder. Future geospatial layers can be added as new information is collected.

Each of the first responders units can feed real time data to the command center. The data can be displayed in real time and updated in 30 second intervals as to: the location of each distinct bar-coded unit; radiation dose rate being sustained; the cumulative radiation sustained to the minute; the quality of radiation (e.g., alpha, beta, or gamma); the direction of movement of that responder device; and the speed of movement of the device in a vehicle or on foot.

The location can be specified in longitude, latitude and elevation by geosatellite positioning. The direction of movement can be, for example, up, down, north, northwest, etc.

The data from hundreds of devices can be displayed on a three-dimensional screen display at the command center. Software within the command center computer system integrates the data from each device into a three-dimensional map, showing the radiation cloud as it is unfolding relative to all the data points from all device inputs, and the number of devices at each radiation safety level at that time. For example, if 20 units are at elevation 200 ft in sector 12 at X latitude, Y longitude, and all 20 have sustained 100 milli-rem irradiation which is 50 percent gamma and 50 percent neutron, the indicator lights on the command center screen for those 20 will be highlighted as flashing red. These 20 will receive text message and redundant verbal commands to "exit the area immediately to the northwest, and do not return". The overlaid real time updated map of assets will tell those 20 not to use routes that are impassable or blocked, but to use known good routes.

While the invention has been described in terms of several embodiments, it will be apparent to those skilled in the art that various changes can be made to the described embodiments without departing from the scope of the invention, as set forth in the following claims.

What is claimed is:

1. An emergency management system comprising:
   a plurality of uniquely identifiable portable monitors;
   each of the monitors including a sensor portion for determining one or more exposure parameters;
   a plurality of geographically separated command centers, each configured to receive real time updated information about an area of interest from the monitors; and
   each of the monitors including a communications portion for providing two-way communications over at least two different types of redundant communications channels with at least two of the command centers, wherein one of the command centers is a command center of record.

2. The emergency management system of claim 1, wherein the sensor portion comprises one or more of: a radiation sensor, a chemical sensor, and a biological sensor.

3. The emergency management system of claim 1, wherein the communications portion transmits a code that identifies one of the monitors.

4. The emergency management system of claim 1, wherein the monitors further include a position detector.

5. The emergency management system of claim 1, wherein the command centers include a display of real time information received from the monitors.

6. The emergency management system of claim 5, wherein the display shows three-dimensional information.

7. The emergency management system of claim 1, wherein the command centers include one or more databases.

8. The emergency management system of claim 1, wherein each of the command centers includes a real time command entry code.

9. A method of managing emergency responders, the method comprising:
   receiving information from a plurality of uniquely identifiable portable monitors;
   sending the information to each of a plurality of geographically separated command centers over at least two different types of redundant communications channels, wherein one of the command centers is a command center of record;
   integrating the information with supplemental data, at the command center of record; and
   transmitting instructions to the emergency responders based on an assessment of the information and the supplemental data.

10. The method of claim 9, wherein the supplemental data further comprises real time updated data that includes one or more of: weather patterns, geographic changes, physical asset status, geo-satellite monitoring information, comprising hospital availability to manage surge capacity for casualties, and road conditions.

11. The method of claim 9, wherein each of the monitors transmits a unique code.

12. The method of claim 9, wherein the step of integrating the information with real time updated supplemental data is performed in a command center.

13. The method of claim 9, further comprising the step of:
    displaying the information and supplemental data in a three-dimensional display.

14. The method of claim 9, wherein the information includes geographic information.

15. The method of claim 9, wherein the information includes exposure time.

16. The method of claim 9, wherein the instructions include a suggested evacuation route.

17. The method of claim 9, further comprising the step of: modeling a plume of radiation.

18. A monitoring device comprising:
    a sensor portion for determining one or more exposure parameters;
    a communications portion for transmitting the exposure parameters to a plurality of geographically separated command centers over at least two different types of redundant communications channels over a communications channel; and
    an identification generator for producing an identification tag associating the monitoring device with a user.

19. The monitoring device of claim 18, wherein the identification tag includes information received on the communications channel.

20. The monitoring device of claim 18, wherein the identification tag comprises a bar code label.

* * * * *